(12) United States Patent
Knoop et al.

(10) Patent No.: US 11,859,593 B2
(45) Date of Patent: Jan. 2, 2024

(54) METHOD FOR TRANSPORTING A TOWER SECTION, TOWER SECTION, TRANSPORTATION SYSTEM AND METHOD FOR INSTALLING A WIND TURBINE

(71) Applicant: Wobben Properties GmbH, Aurich (DE)

(72) Inventors: Frank Knoop, Aurich (DE); René Mertens, Oranienburg (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/535,224

(22) Filed: Nov. 24, 2021

(65) Prior Publication Data

US 2022/0170445 A1   Jun. 2, 2022

(30) Foreign Application Priority Data

Nov. 27, 2020   (DE) .......................... 102020131574.0

(51) Int. Cl.
| | | |
|---|---|---|
| *F03D 13/40* | (2016.01) | |
| *F03D 13/20* | (2016.01) | |
| *F03D 13/10* | (2016.01) | |
| *E04H 12/34* | (2006.01) | |

(52) U.S. Cl.
CPC ............. *F03D 13/40* (2016.05); *E04H 12/34* (2013.01); *F03D 13/10* (2016.05); *F03D 13/20* (2016.05); *F05B 2230/61* (2013.01); *F05B 2260/02* (2013.01)

(58) Field of Classification Search
CPC .......... F03D 11/04; F03D 13/20; F03D 13/22; F03D 13/40; F03D 13/10; E04H 12/34; F05B 2230/61; F05B 2260/02
See application file for complete search history.

(56) References Cited

U.S. PATENT DOCUMENTS

| | | | |
|---|---|---|---|
| 10,041,479 B2 | 8/2018 | Pedersen | |
| 2011/0176904 A1* | 7/2011 | Stiesdal | .................. B21D 3/16 |
| | | | 410/47 |
| 2017/0253169 A1 | 9/2017 | Keller et al. | |
| 2020/0340453 A1 | 10/2020 | Küpker et al. | |
| 2022/0170445 A1* | 6/2022 | Knoop | .................... F03D 13/10 |

FOREIGN PATENT DOCUMENTS

| | | |
|---|---|---|
| DE | 102017127035 A1 | 5/2019 |
| EP | 2937561 A1 | 10/2015 |
| JP | 2011144807 A | 7/2011 |

* cited by examiner

*Primary Examiner* — Andrew J Triggs
(74) *Attorney, Agent, or Firm* — SEED INTELLECTUAL PROPERTY LAW GROUP LLP

(57) ABSTRACT

A method for transporting a tower section of a wind turbine, comprising the steps of: providing a tower section which is adapted to be transported in a predetermined transport position, wherein the tower section when in the transport position has a longitudinal axis extending in the horizontal direction and a wall extending along the longitudinal axis, wherein the tower section is adapted to adopt a first vertical height when in an unstressed state in the transport position, applying a deformation force to the wall so as to elastically deform at least one portion of the tower section in such a way that the tower section adopts a second vertical height that is smaller than the first vertical height when in an elastically deformed state in the transport position, and locking the tower section in the elastically deformed state.

19 Claims, 8 Drawing Sheets

METHOD FOR TRANSPORTING A TOWER SECTION, TOWER SECTION, TRANSPORTATION SYSTEM AND METHOD FOR INSTALLING A WIND TURBINE

BACKGROUND

Technical Field

The invention relates to a method for transporting a tower section for a wind turbine. The invention relates further to a corresponding tower section for a wind turbine, to a transport device for holding and transporting a tower section, and to a method for installing a wind turbine at an installation site.

Description of the Related Art

Methods for transporting a tower section for a wind turbine are generally known from the prior art. In such methods, tower sections mostly with pre-assembled connector flanges are retained in a transport position in such a way that their longitudinal axis is substantially horizontal and that they have a vertical height which defines the overall travelling height in that position. Tower sections in that transport position also have a horizontal width which is orthogonal to the vertical height and the longitudinal axis, and which defines the overall travelling width.

National regulations governing transportation on public roads specify maximum permissible travelling widths and travelling heights, inter alia. In many cases, the maximum permissible travelling width is greater than the maximum permissible travelling height of the vehicles, including their freight. For example, a maximum travelling width of 5 m is allowed in Germany, without additional protective measures such as a police escort being required. On the other hand, the maximum permitted travelling height is only 4.3 m, because of bridges and the like. Due to the fact that the cross-section of tower sections is symmetrical in many cases, the limit on the permissible travelling height thus results in the travelling width also being reduced by necessity. The cross-sectional area of the tower section is therefore limited in total, and the permissible travelling width, in particular, is not used to the full when transporting the tower section. The wall thickness of the tower sections is often increased in this regard, the aim being to ensure that the tower section has sufficient stability and load-bearing capacity despite the limited cross-sectional area, even for large nacelles. The concomitant extra weight, in turn, makes it more difficult to transport and handle the tower segment.

In many cases, the tower sections are split along the longitudinal axis into two parts, the aim being to install wind turbines comprising tower sections that would otherwise exceed the maximum permissible travelling height in the transport position. The split tower section must then be assembled at the installation site, which is costly and time-consuming. The two joints thus produced result in the tower section being weakened and hence in an overall reduction in the load-bearing capacity. Joining the split tower sections together also requires more assembly time and therefore additional costs compared to smaller towers with integral tower sections. Splitting the tower section also results in higher production costs to begin with, compared to smaller towers made of rolled steel pipes.

BRIEF SUMMARY

Provided is a method for transporting a tower section, which allows optimized use of the permissible travelling heights and travelling widths specified by law, so that it is possible to transport tower sections for which the disadvantageous effects of longitudinal splitting can be avoided. Provided is a transportation system for transporting a tower section and in particular with a novel method, and a method for installing a wind turbine with such a tower section at the installation site.

Provided is method for transporting a tower section for a wind turbine, by the method comprising the steps of:

A) providing a tower section which is adapted to be transported in a predetermined transport position, wherein the tower section when in the transport position has a longitudinal axis extending in the horizontal direction and a wall extending along the longitudinal axis, wherein the tower section is adapted to adopt a first vertical height when in an unstressed state in the transport position, B) applying a deformation force to the wall so as to elastically deform at least one portion of the tower section in such a way that the tower section adopts a second vertical height that is smaller than the first vertical height when in an elastically deformed state in the transport position, and C) locking the tower section in the elastically deformed state.

The first and second vertical heights within the meaning of the disclosure each define the maximum height of the tower section along its longitudinal axis. By means of the method, a tower section of a wind turbine can thus be flattened in the vertical direction by elastic deformed, namely by the tower section adopting a second vertical height, when in the elastically deformed state in the transport position, that is smaller than the first vertical height.

In most cases, the maximum permissible travelling width is greater than the maximum permissible travelling height, a fact that is advantageously exploited by the inventors, in that, according to the inventive method, the tower section is elastically deformed, at least in portions thereof, in such a way that its vertical height in the transport position is reduced. In the method, elastic deformation is also performed in such a way that any elastic deformation resulting in an increase in travelling width does not exceed the permissible travelling width. The travelling height, that is, the vertical height of the tower section in the transport position, can thus be reduced from a first vertical height to a second vertical height that specifically meets the national stipulations regarding travelling height. The size of the wind turbine can thus be maximized in respect of its cross-sectional area.

The method preferably comprises one or both of the steps of: D) providing a transportation system for retaining and transporting the tower section in the transport position, and/or E) moving the tower section onto the transportation system in the transport position, for example if the tower section has not already been provided in the transport position. In the method, handling the tower section is made easier by providing a transportation system, and the tower section can be securely retained and transported.

It is also preferred that one or both of steps D) and E) is carried out before step B), such that the deformation force is applied to the wall in the transport position. In particular, steps B) and C) are made easier by the tower section having already been moved into the transport position and preferably fixed in place on the transportation system.

It is also preferred that the wall includes a flowable material and that the stress induced in the tower section by means of the deformation force is less than the 0.2% proof stress and/or the elastic limit of the material.

The mechanical stress above which a material begins to yield is referred to as the elastic limit or yield point. Any stresses above the elastic limit cause permanent plastic deformation, and the material may deform under less strongly increasing stress or even under decreasing stress. In the case of tensile stress, this is referred to as the yield strength or, if the precise point at which yield occurs cannot be determined exactly, as the proof stress. The 0.2% proof stress is the uniaxial mechanical stress at which the permanent elongation relative to the initial length of the sample is 0.2% after the removal of stress. In contrast to the elastic limit, the 0.2% proof stress can be clearly determined, particularly in the case of precipitation-hardened materials such as aluminum alloys.

Plastic deformation of the wall in excess of 0.2% can therefore be efficaciously prevented. To achieve the aim of realizing a sufficient reduction in travelling height, it is advantageous to select the deformation force such that the stress induced by it comes close to the elastic limit or the 0.2% proof stress, but does not exceed it.

The stress induced in the tower section by means of the deformation force is preferably within a range from 40% to 95% of the yield point or the 0.2% proof stress of the material, and particularly preferably within a range from 50% to 90%. Within these ranges, it is still ensured with sufficient probability that impact loads resulting from transportation, and other such unforeseen circumstances, do not lead to undesired plastic deformation of the tower section.

According to a preferred embodiment, the tower section has a symmetrical, in particular round, oval or polygonal cross-section with an area center, wherein the deformation force is introduced into the wall of the tower section in the direction of the area center. A round, oval or polygonal cross-section with an area center has the advantage that, by avoiding sharp edges or avoiding edges in general, notch stresses are reduced and the resilience and load-bearing capacity of the tower section is increased. In particular, the force acting on the wall can be distributed better over the entire wall, which extends around the cross-section in the direction of the longitudinal axis. Within the meaning of the disclosure, the cross-section may be constant or variable along the longitudinal axis. The cross-sections of the tower sections as described herein may also be present along the entire longitudinal axis, or only in portions thereof, and may, for example, be combined with each other. The wall is preferably provided in closed form.

According to another preferred embodiment, the wall has two edge regions each having an edge extending in a longitudinal direction and which are spaced apart from each other in the circumferential direction, wherein the edges are guided past each other when the tower section is elastically deformed, such that the edge regions overlap each other when the tower section is in the elastically deformed state. Elastic deformation can thus be carried out by means of a reduced deformation force compared to the deformation force to be applied to elastically deform a tower section with a closed wall. This makes it easier, in particular, to perform step B) of the method. As the edges pass each other, the wall deforms thereby in a spiral or helical shape in the cross-sectional plane of the tower section orthogonal to the longitudinal axis.

The tower section preferably has a constant cross-section along the longitudinal axis, in particular a round, oval or polygonal cross-section, and is elastically deformed along its longitudinal axis in accordance with step B). Thus, due to the constant cross-section, the tower section is easy to manufacture and is completely deformed elastically in accordance with step B) of the method, thus ensuring a constant vertical height along the longitudinal axis.

According to another preferred embodiment, the tower section tapers at least in portions thereof in such a way that the first vertical height is a maximum height in the transport position and the tower section is elastically deformed in accordance with step B) only in a region adjacent to the first vertical height in the direction of the longitudinal axis. The inventors advantageously realized that it is sufficient in this case to elastically deform only the region which is adjacent to the region where the vertical height is at its maximum. That region is sufficient insofar as the vertical height in that region exceeds the maximum permissible travelling height. If, for example, the maximum permissible travelling height in the vertical direction is only 4.3 meters (m) due to national regulations, the entire region of the tower section along the longitudinal axis is deformed as far as the point from which the vertical height in the relaxed, unstressed state in the transport position does not exceed the permissible travelling height of 4.3 m.

The deformation force is preferably introduced into the wall of the tower section by at least one tensioning system which is coupled to a number of corresponding load introducing elements of the tower section. By using load introducing elements, it is possible to enhance the reliability and reproducibility of the steps of the method.

The tensioning system preferably has a number of ties each having two coupling sections at their ends and which are coupled at each of their coupling sections to a corresponding load introducing element, wherein the deformation force for elastic deformation is introduced into the load introducing elements and the wall by means of the ties, and/or the tensioning system preferably has a tensioning system, for example in the form of one or more tensioning straps or tensioning cables, that is coupled to at least two load introducing elements of the tower section, wherein the deformation force for elastic deformation is introduced into the load introducing elements and the wall by means of the tensioning strap. The ties may be designed as pull rods or as (preferably horizontally extending) push rods. Both the ties and the tensioning system are appropriate and easily handled means for introducing a deformation force and tensioning the tower section. Such tensioning systems can each be coupled preferably to only one portion of the tower section and to the load introducing elements arranged there, so that the deformation force can be introduced uniformly along the longitudinal direction into the wall of the tower section. A plurality of tensioning systems can also be coupled preferably to each other and introduce deformation forces cumulatively into the tower section.

The deformation force for elastic deformation of at least one portion of the tower section is preferably introduced orthogonally to the longitudinal direction by means of the tensioning system into load introducing elements which are designed as welded-on plates and/or as bolt arrangements with bolts. Welded-on plates and/or bolt arrangements are appropriate and easily handled load introducing elements, whereby the bolts of the bolt arrangements can remain in the tower section even after transportation, for example, in order to prevent or reduce notch stress. The bolts can be secured in a known manner against inadvertent loosening by securing members in the tower section and cooperate, for example, with joining points such as holes or the like.

It is also preferred that the tensioning system has a motor-driven cable pull or chain hoist or cable winch which is adapted to introduce the deformation force into the corresponding load introducing elements and/or to absorb the deformation force in a controlled manner in order to relieve the stress on the elastically deformed tower section. The deformation force is thus introduced by the tensioning system into the corresponding load introducing elements by means of a motor-driven cable pull or chain hoist or cable winch. A motor-driven cable pull or chain hoist or cable winch allows an easily handled and mechanically optimized system for introducing force.

According to a preferred embodiment, the method further comprises the step of arranging and/or fixing stiffening members in the tower section in order to brace the tower section in the vertical direction, the stiffening members preferably being arranged in the tower section before elastic deformation. Such stiffening members secure the tower section against undesired plastic deformation caused during transportation by loads resulting from transportation, such as impact loads.

The wall preferably has a wall thickness of between 10 and 70 mm, wherein its height is between 4350 and 4850 mm, and the elastic deformation of the portion of the tower section is characterized by a coefficient of deformation $K_{\Delta h}$ that results from the travelling height to be complied with in the transport position, the material, and the ratio of the change in vertical height ($\Delta h$) in the transport position as a result of the deformation to the wall thickness (t). For tower sections, the coefficient of deformation is in a range from 1.0 to 55 for killed unalloyed S355 steel and a 4.3 m travelling height to be complied with, particularly preferably in a range from 1.1 to 53. The coefficient of deformation $K_{\Delta h}$ is thus calculated using equation (1):

$$K_{\Delta h} = \frac{h_1 - h_2}{t} = \frac{\Delta h}{t} \quad (1)$$

A second aspect relates to a tower section for a wind turbine, which is adapted to be transported in a predetermined transport position, wherein the tower section when in the transport position has a longitudinal axis extending in the horizontal direction and a wall extending along the longitudinal axis, wherein the tower section is adapted to adopt a first vertical height when in an unstressed state in the transport position.

The tower section according to the second aspect by the tower section has a number of load introducing elements which are arranged spaced apart from each other in the direction of the longitudinal axis and which can be coupled to a tensioning system in order to apply a deformation force to the wall so as to elastically deform at least a portion of the tower section in such a way that the tower section adopts a second vertical height that is smaller than the first vertical height when in an elastically deformed state in the transport position, and in order to fix the tower section in the elastically deformed state. Such a tower section utilizes the advantages described with reference to the first aspect. Preferred embodiments of the first aspect are at the same time preferred embodiments of the second aspect, and vice versa.

According to a preferred embodiment, the tower section has a round, oval or polygonal cross-section having an area center, wherein at least two load introducing elements are fixed inside the wall opposite one another and are adapted to be coupled to each other in pairs by means of the tensioning system in order to introduce the deformation force into the wall in the direction of the area center. Alternatively or additionally, the load introducing elements are arranged on the wall in such a way that the deformation force is introduced into the wall eccentrically, that is, in a direction extending at a distance from the area center.

A round, oval or polygonal cross-section with an area center has the advantage that, by avoiding sharp edges or avoiding edges in general, notch stresses are reduced and the resilience and load-bearing capacity of the tower section is increased. In particular, the force acting on the wall can be distributed better over the entire wall, which extends around the cross-section in the direction of the longitudinal axis. The cross-section may be constant or variable along the longitudinal axis. The cross-sections of the tower sections as described herein may also be present along the entire longitudinal axis, or only in portions thereof, and may, for example, be combined with each other. The wall is preferably provided in closed form.

The wall preferably includes a steel material, in particular a high-strength steel material, the steel material having preferably been heat-treated by stress-relief annealing.

A third aspect relates to a tower section for a wind turbine, which is adapted to be transported in a predetermined transport position, wherein the tower section when in the transport position has a longitudinal axis extending in the horizontal direction and a wall extending along the longitudinal axis, wherein the tower section is adapted to adopt a first vertical height when in an unstressed state in the transport position.

The tower section according to the third aspect by the wall has two edge regions each having an edge extending in a longitudinal direction, wherein the two edges are spaced apart from each other in the circumferential direction and designed to be guided past each other during elastic deformation of the tower section, such that the edge regions overlap each other when the tower section is in the elastically deformed state. Such a tower section utilizes the advantages described with reference to the first and second aspects. The preferred embodiments of the first and second aspect are also preferred embodiments of the third embodiment, and vice versa.

A fourth aspect relates to a transportation system for retaining and transporting a tower section in a transport position, in particular a tower section according to the second or third aspect, wherein the tower section when in the transport position has a longitudinal axis extending in the horizontal direction and a wall extending along the longitudinal axis.

The transportation system by a first pivot bearing and a second pivot bearing provide a support surface for a wall of the tower section, wherein the first and second pivot bearings are adapted to retain the tower section in the transport position in an unstressed state in which the tower section adopts a first vertical height, and in an elastically deformed state in which the tower section adopts a second vertical height that is less than the first vertical height. The transportation system according to the fourth aspect utilizes the advantages described with reference to the first, second and third aspects. Preferred embodiments of the first, second and third aspects are equally preferred embodiments of the fourth aspect.

In another aspect, provided is a method for installing a wind turbine at an installation site.

Provided is a method for installing a wind turbine at an installation site, by the method comprising the steps of:

providing a tower section locked in an elastically deformed state, in particular a tower section according to any one of the embodiments described above, relaxing the tower section at the installation site, so that it adopts an unstressed state with a first vertical height in the transport position, providing a connector flange at the installation site, fixing the connector flange to an end portion of the tower section, in particular by means of a fish plate connection, erecting the tower section in such a way that the longitudinal direction is substantially vertical and the connector flange is arranged at the bottom end of the tower section, joining the tower section by means of the connector flange to a foundation embedded in the ground of the installation site, in particular to a foundation basket.

The method for installing a wind turbine according to the fifth aspect utilizes the advantages described with reference to the first to fourth aspects. Preferred embodiments of the previous aspects are at the same time preferred embodiments of the fifth aspect, and vice versa.

The tower section is preferably provided at the installation site by means of a method according to the first aspect.

BRIEF DESCRIPTION OF THE SEVERAL VIEWS OF THE DRAWINGS

The invention shall now be described in greater detail with reference to preferred embodiments and the attached Figures, in which.

DETAILED DESCRIPTION

Figure 1:
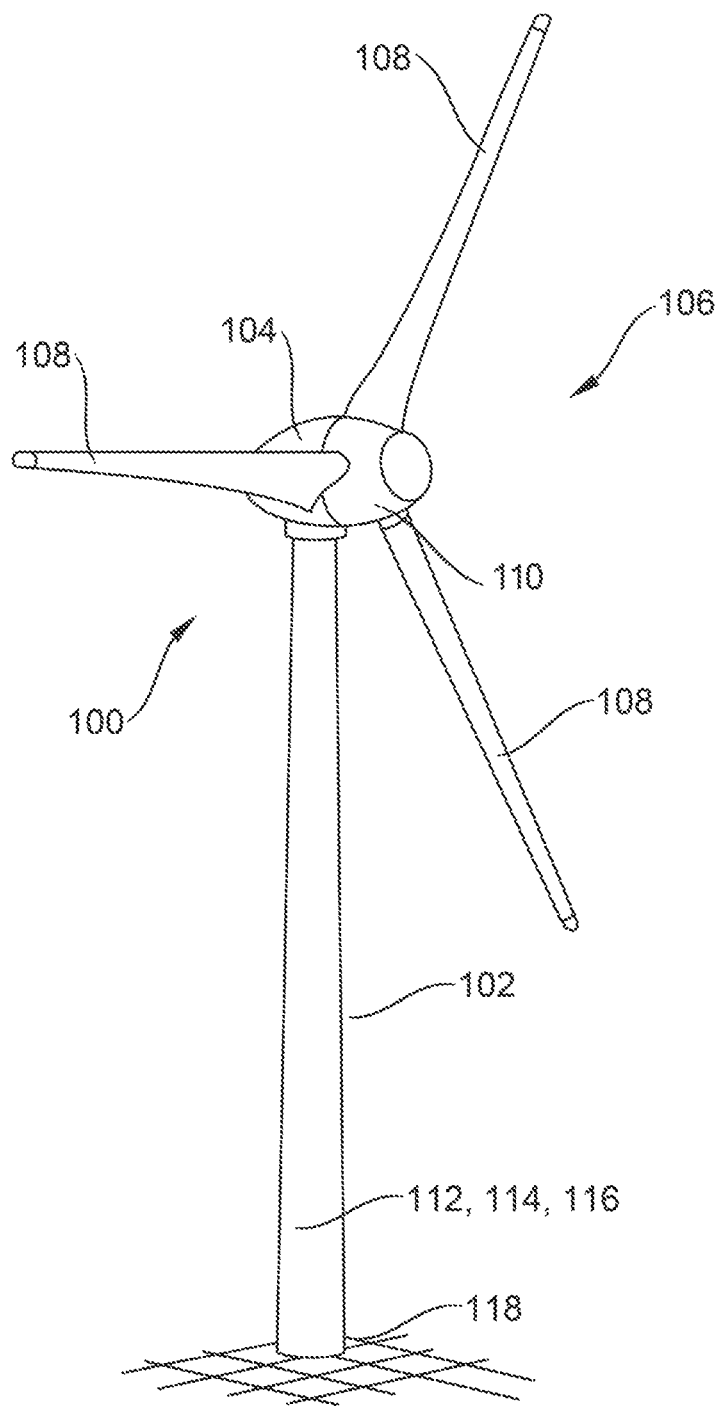
FIG. 1 shows a wind turbine according to a preferred embodiment.

FIG. 1 shows a wind turbine 100 erected at an installation site, having a tower 102 on which a nacelle 104 is mounted.

A rotor arrangement 106 is mounted rotatably on nacelle 104. Rotor arrangement 106 has a rotor hub 110 and rotor blades 108. Rotor arrangement 106 drives a generator (not shown) for generating electric power.

The tower 102 of wind turbine 100 comprises a tower section 112, 114, 116, and a connector flange 118 (only hinted at in FIG. 1) which is arranged at the bottom end of the tower section and adapted to join the tower section to a foundation embedded in the ground of the installation site, or to a foundation basket.

Figure 2A:
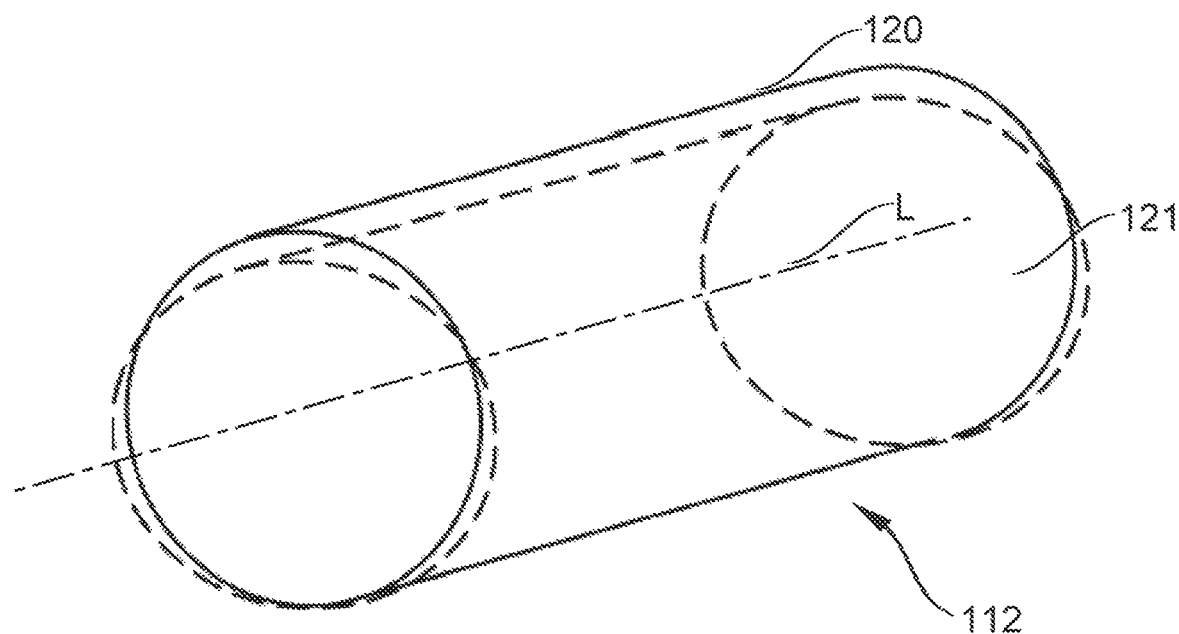
FIG. 2a shows a perspective view of a tower section in an elastically deformed state according to a first embodiment.

FIGS. 2a and b show a tower section 112 according to a first preferred embodiment. As indicated in the Figures, tower section 112 is elastically deformed by applying deformation forces $F_1$, $F_2$ in accordance with a method according to a first preferred embodiment.

Tower section 112 has a wall 120 and a longitudinal axis L, with wall 120 extending along longitudinal axis L. Wall 120 forms the outer surface of the cylindrical tower section 112.

Figure 2B:
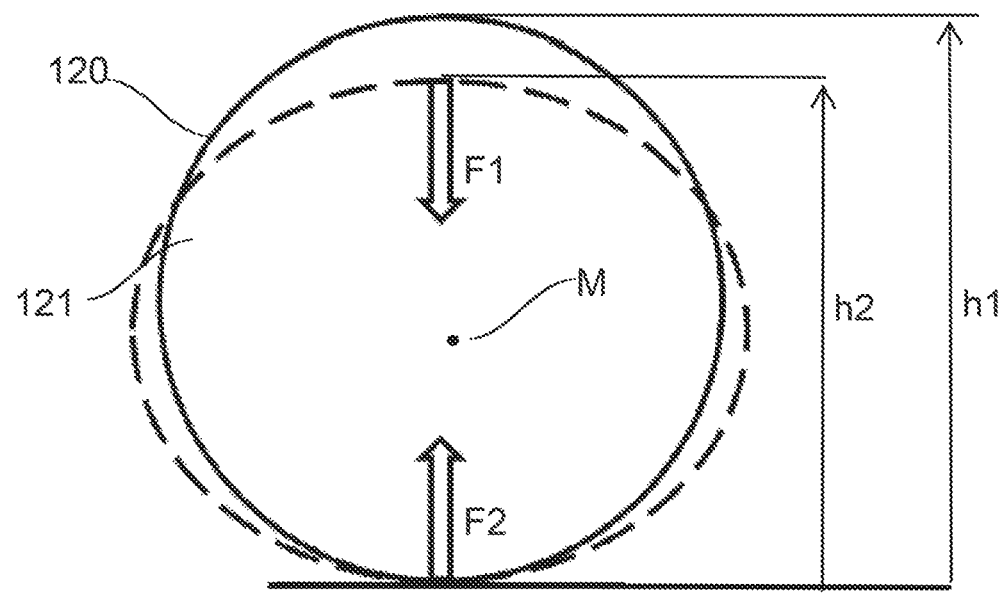
FIG. 2b shows the tower section of FIG. 2a in a side view.

FIGS. 2a and 2b show tower section 112 in a transport position, in which longitudinal axis L extends substantially in a horizontal direction. As is shown in FIG. 2b, in particular, tower section 112 in the transport position has a vertical height $h_1$ in the relaxed state. According to the embodiment of tower section 112 shown here, the vertical height $h_1$ is constant in longitudinal direction L.

In the present embodiment, tower section 112 has a round cross-section 121 with an area center M, cross-section 121 being constant along longitudinal axis L.

As FIG. 2b shows, in order to elastically deform at least one portion of tower section 112, deformation forces $F_1$, $F_2$ are applied to wall 120 in such a way that, in an elastically deformed state (indicated by the broken lines) in the transport position shown, tower section 112 adopts a second height $h_2$ that is less than the first vertical height $h_1$. Deformation forces $F_1$, $F_2$ are applied orthogonally to the longitudinal direction L, the effective direction being in the direction of area center M, with the result that cross-section 121 of tower section 112 is deformed into a substantially oval shape. Deformation forces $F_1$ and $F_2$ are preferably of equal magnitude and in opposite directions.

In the manner shown in FIG. 2b, deformation forces $F_1$, $F_2$ are applied to wall 120 uniformly and preferably at regular intervals along longitudinal axis L to wall 120 such that tower section 112 is elastically deformed uniformly along longitudinal axis L.

Figure 3A:
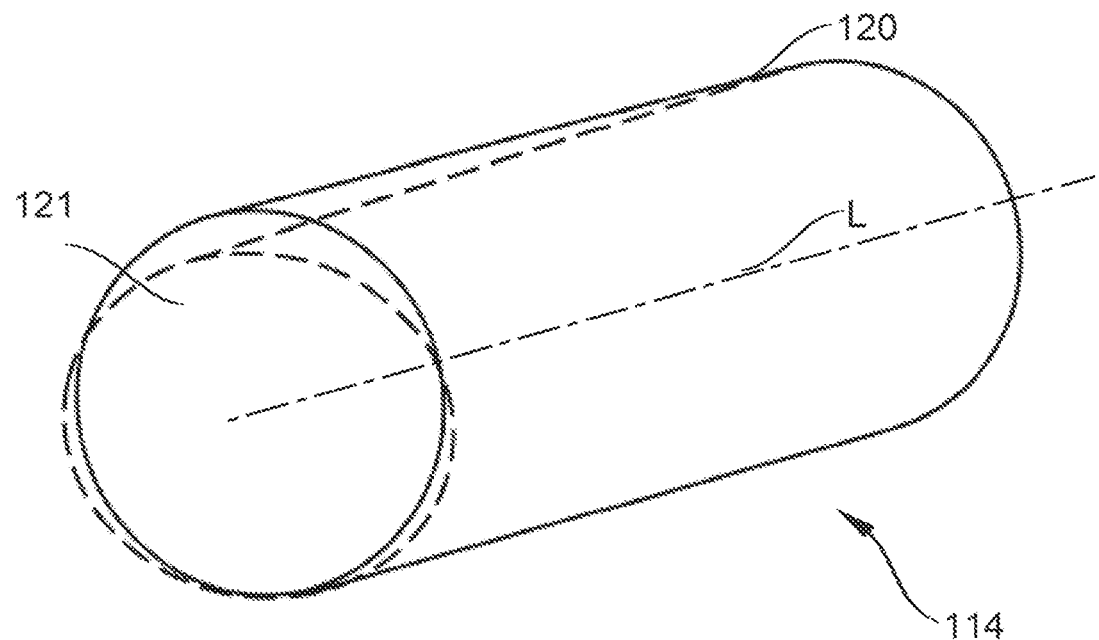
FIG. 3a shows a perspective view of a tower section of a wind turbine in an elastically deformed state according to a second preferred embodiment.
Figure 3B:
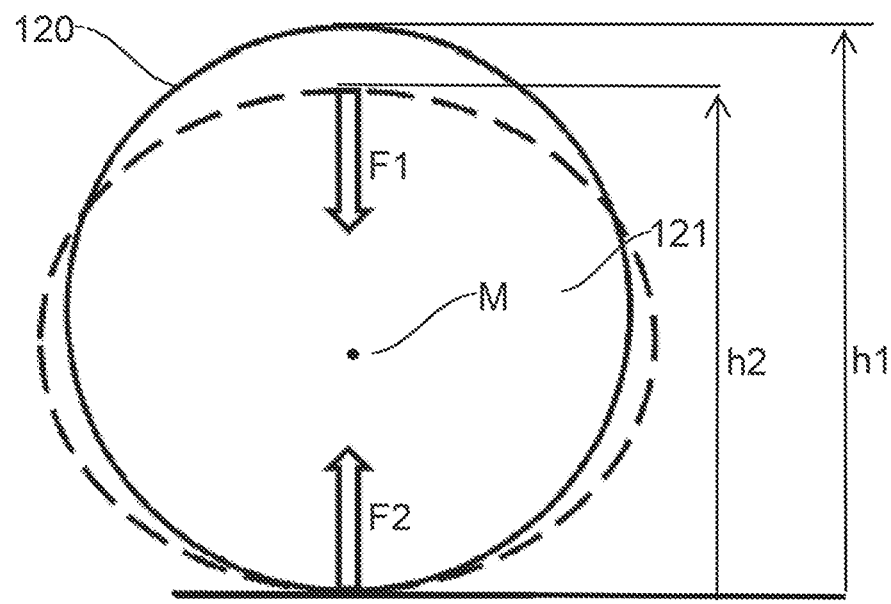
FIG. 3b shows the tower section of FIG. 3a in a side view.

FIGS. 3a and 3b show a tower section 114 which has been elastically deformed by a method according to a second preferred embodiment.

Tower section 114 has a wall 120 that extends along the longitudinal axis L, and a cross-section 121, and tapers in portions in such a way that, in the transport position shown, height $h_1$ is a maximum height from which the vertical height decreases in the direction of the longitudinal axis L.

In order to deform tower section 114 elastically, deformation forces $F_1$, $F_2$ are applied to wall 120 in a locally confined manner in a region which is adjacent to the maximum height $h_1$ in the direction of the longitudinal axis. Tower section 114 thus deforms elastically only in the region adjacent the maximum height $h_1$, the vertical height $h_1$ being reduced thereby to a second vertical height $h_2$.

According to the first embodiment, elastic deformation is preferably carried out by deformation forces $F_1$, $F_2$ of equal magnitude acting in opposite directions, the effective direction of which is in the direction of area center M. The cross-section 121 shown in the Figure is round in the present case, but it can adopt any shape, wherein a round, oval or polygonal cross-sectional area is to be preferred.

Figure 4A:
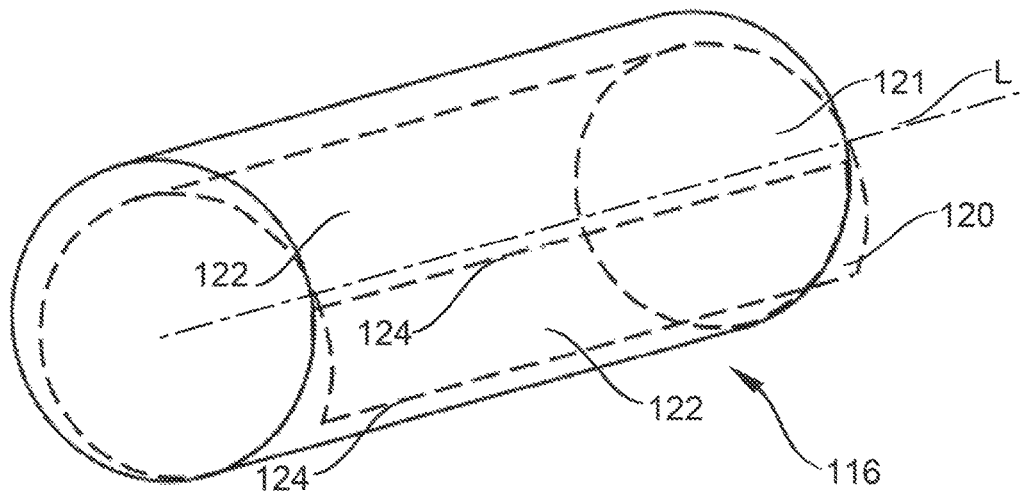
FIG. 4a shows a perspective view of a tower section of a wind turbine in an elastically deformed state according to a third embodiment.
Figures 4B, 4C:
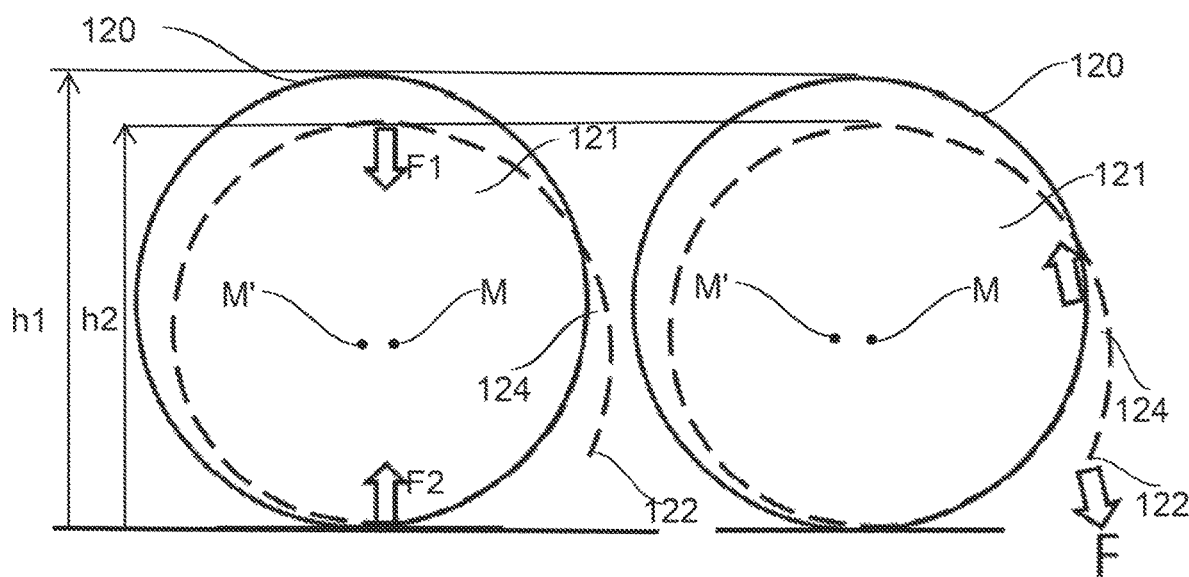
FIG. 4b shows the tower section of FIG. 4a in a side view, the deformation force being introduced according to a preferred embodiment.
FIG. 4c shows the tower section of FIG. 4a in a side view, the deformation force being introduced according to another preferred embodiment.

FIGS. 4a-4c show the elastic deformation of a tower section 116 by a method according to a third preferred embodiment.

In FIG. 4a, tower section 116 is shown in a transport position in which tower section 116 has a longitudinal axis L extending in the horizontal direction, a vertical height, and a wall 120 extending along the longitudinal axis. In the unstressed state in the transport position, tower section 116 has a constant maximum height $h_1$. The tower section also has a cross-section 121 orthogonal to the longitudinal direction L and with an area center M.

Wall 120 has two edge regions 122 that each have an edge 124 extending in a longitudinal direction L and which are spaced apart from each other in the circumferential direction.

In the method in the embodiment shown, edges 124 are guided past each other to elastically deform section 116, such that edge regions 122 overlap each other in the elastically deformed state of tower section 116, as indicated in FIGS. 4a-4c.

According to the embodiment shown in FIG. 4b, deformation forces $F_1$, $F_2$, which are preferably of the same magnitude and act in opposite directions, are applied to wall 120 in such a way, in order to elastically deform tower section 116, that their effective direction is in the direction of the area center M of cross-section 121. The elastic deformation of tower section 116 causes area center M to be displaced, and forces $F_1$, $F_2$ follow the displacement of area center M, with the result that their effective direction is still at least approximately in the direction of the displaced area center M'.

The deformation of tower section 116 as shown in FIG. 4c differs from the embodiment shown in FIG. 4b in that a deformation force F is applied eccentrically to wall 120 in edge region 122, i.e., with an effective direction that is spaced apart from area center M. Compared to the embodiment shown in FIG. 4b, this has the advantage that a reduced deformation force F is sufficient for elastic deformation of tower section 116.

According to FIGS. 4b and 4c, wall 120 is deformed thereby in such a way that it curls into a spiral or helical shape in the side view.

If a tower section 116 according to FIGS. 4a-4c is provided, it is also necessary, before erecting the wind turbine 100 according to FIG. 1, to join edges 124 to each other along the entire longitudinal axis L of tower section 116 before attaching tower section 116 to connector flange 118.

Figure 5:
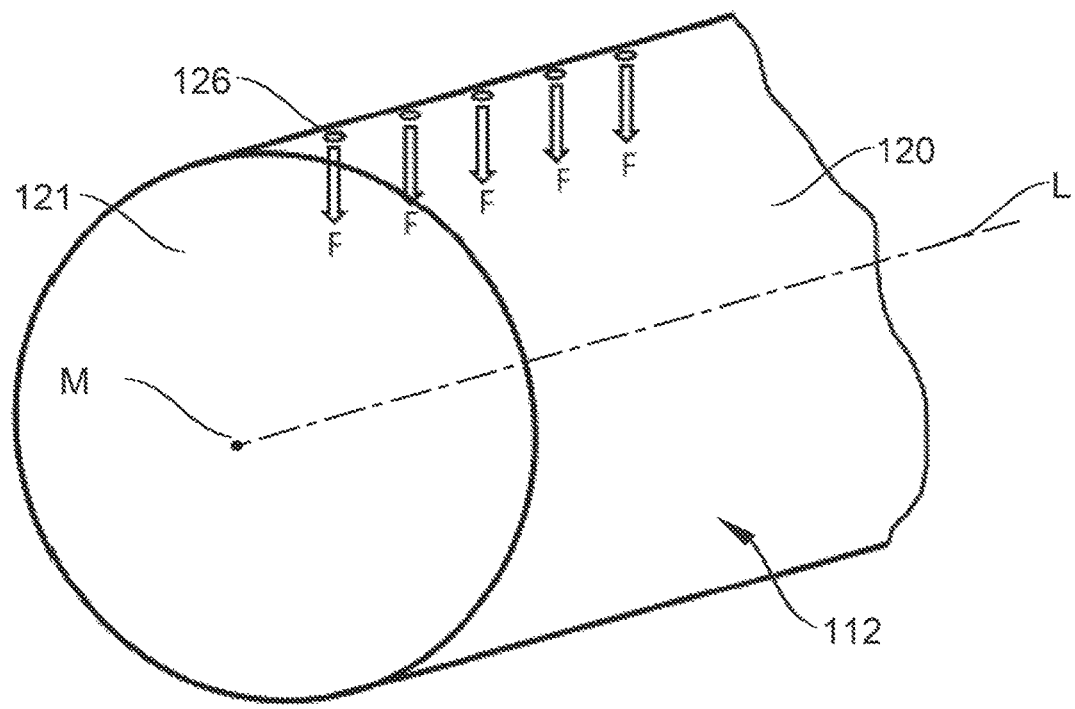
FIG. 5 shows a tower section with joining points for load introducing elements according to a first preferred embodiment.

FIG. 5 shows tower section 112 in an unstressed state. Tower section 112 has a number of joining points 126 spaced apart from each other in the longitudinal direction L in wall 120. Joining points 126 are adapted to be coupled to corresponding load introducing elements 128, 129 (cf. FIGS. 6, 7 and 8) for applying a deformation force F to wall 120. Joining points 126 are provided in the form of holes and in the transport position are arranged in the region of the maximum vertical height of tower section 112.

Figure 6:
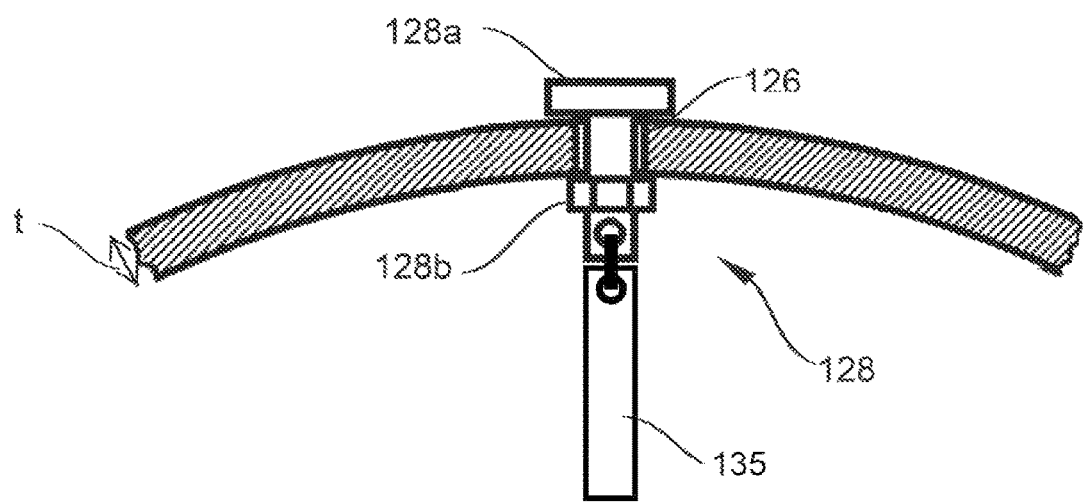
FIG. 6 shows a portion of the tower section of FIG. 5 with a mounted load introducing element

FIG. 6 shows an example of a load introducing element in the form of a bolt arrangement 128 comprising a number of bolts 128a and a number of corresponding securing members 128b for securing bolts 128a. As FIG. 5, in particular, shows, bolts 128a are each engaged with a joining point 126 provided in the form of a hole in wall 120. Bolt 128a is secured by securing member 128b in hole 126. Securing member 128b is provided in the form of a nut.

The distance in longitudinal direction L between the individual load introducing elements 128a and hence also between the corresponding joining points 126 is dependent on the wall thickness t and the maximum height $h_1$ of tower section 112.

For example, if the stress induced by deformation force F is no more than 300 N/m², the wall thickness t is 60 mm and the elastic deformation as a result of applying a deformation force F in the direction of area center M, preferably 13 evenly distributed load introducing elements per meter are attached to wall 120.

Load introducing elements 128a can be coupled to each other preferably by means of pull rods 135 or a strap or cable in order to apply the elastic deformation force. The deformation force F to be applied depends on the wall thickness t of wall 120 and the yield point or the 0.2% proof stress of the material being used and which the wall at least partly includes.

After tower section 112 has been relieved of stress or load at the installation site following transportation, load introducing elements 128a preferably remain in joining points 126 in order to reduce any weakening of tower section 112 as a result of the notch stresses.

Figure 7:
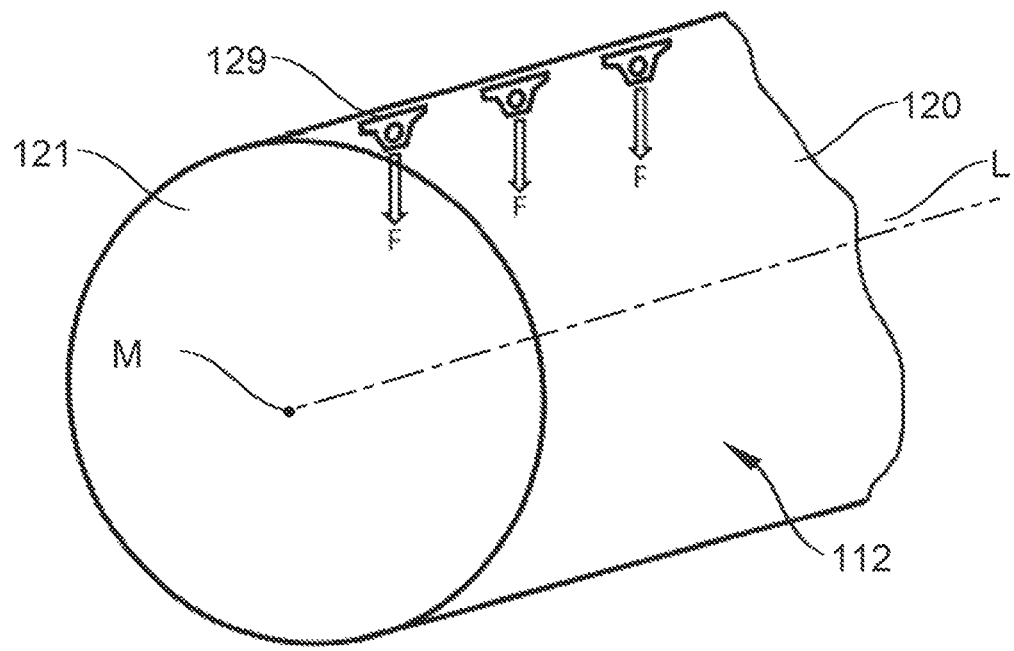
FIG. 7 shows a tower section with load introducing elements according to a second preferred embodiment.
Figure 8:
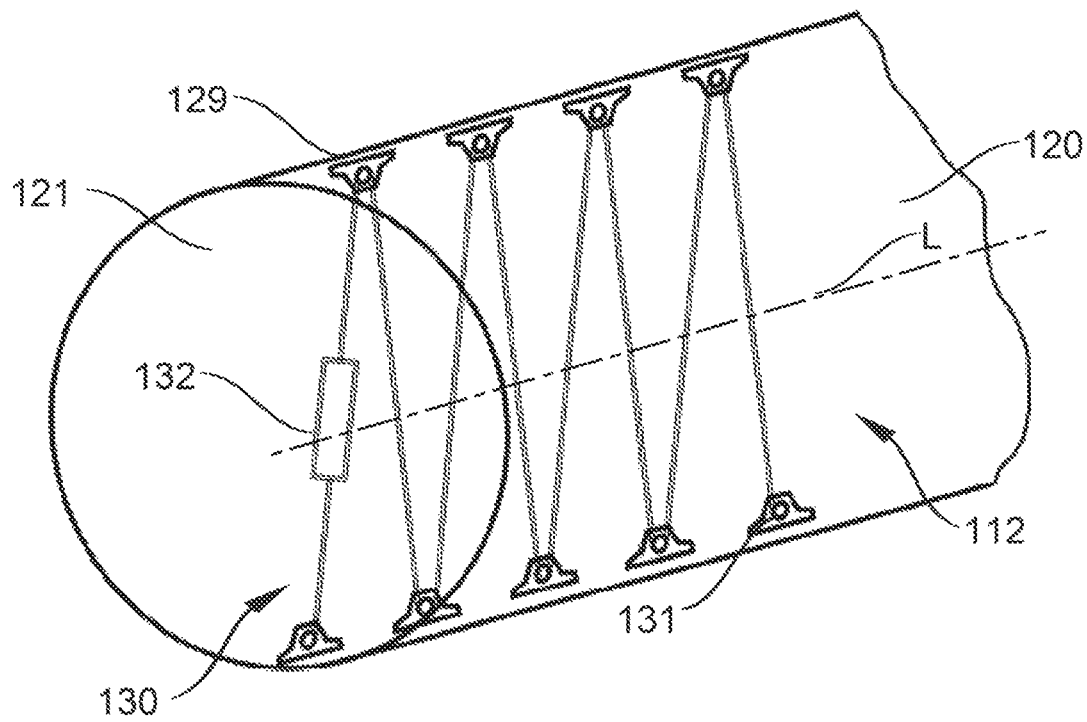
FIG. 8 shows the tower section of FIG. 7 with a tensioning system.

FIGS. 7 and 8 show a tower section 112 with load introducing elements 129 according to a second preferred embodiment.

This embodiment differs from the embodiment shown in FIG. 6 in that load introducing elements 129 are thermally joined, preferably welded, to the inner side of wall 120 without any additional joining point. Load introducing elements 129 are provided in the form of metal sheets or plates with an edge extending substantially in the direction of longitudinal axis L, and which are joined thermally to the inner side of wall 120. Load introducing elements 129 have recesses 131 which are preferably cylindrical and with which tensioning systems can be brought into engagement in order to apply a deformation force F to wall 120.

As shown in FIG. 8, in particular, recesses 131 can be coupled to a tensioning system comprising a tensioning cable 130 and a cable winch or chain hoist 132 that is only outlined in FIG. 8.

Tensioning cable 130 is adapted to couple each of the load introducing elements 129 spaced apart in longitudinal direction L and arranged substantially in a row to at least one corresponding load introducing element 129 arranged spaced apart and substantially in a row in longitudinal direction L on the opposite wall. A first load introducing element 129 is preferably coupled by means of a tensioning cable 130 to only one opposite load introducing element 129, with each of the following load introducing elements 129 being coupled to two load introducing elements 129 on the opposite wall, such that tensioning cable 130 is tensioned between the opposite portions of wall 120 and engages alternately with a respective load introducing element 129. The last load introducing element in an edge portion of tower section 112 is coupled to only one opposite load introducing element 129 and is adapted to guide tensioning cable 130 in such a way that it engages with cable winch or chain hoist 132 to apply a deformation force F to each of load introducing elements 129. The tower section is subsequently relieved of stress or load at the installation site in a preferably controlled manner by means of such a cable winch or chain hoist.

Tower section 112 preferably comprises a plurality of tensioning systems that preferably have a tensioning cable 130 or tensioning strap and that can each be brought into engagement with some of the available load introducing elements 129 in the respective portion in order to apply a deformation force F to wall 120. A plurality of tensioning systems are thus used to allow deformation force F to be introduced more evenly into the respective load introducing elements 129 coupled thereto. The same also applies to the embodiment shown in FIG. 6.

The load introducing elements 128, 129 shown in FIGS. 6-8 can also be attached to a different position on wall 120, for example to allow force to be applied eccentrically so as to elastically deform tower section 112 (cf. FIGS. 4*a* and 4*c*).

Figure 9:
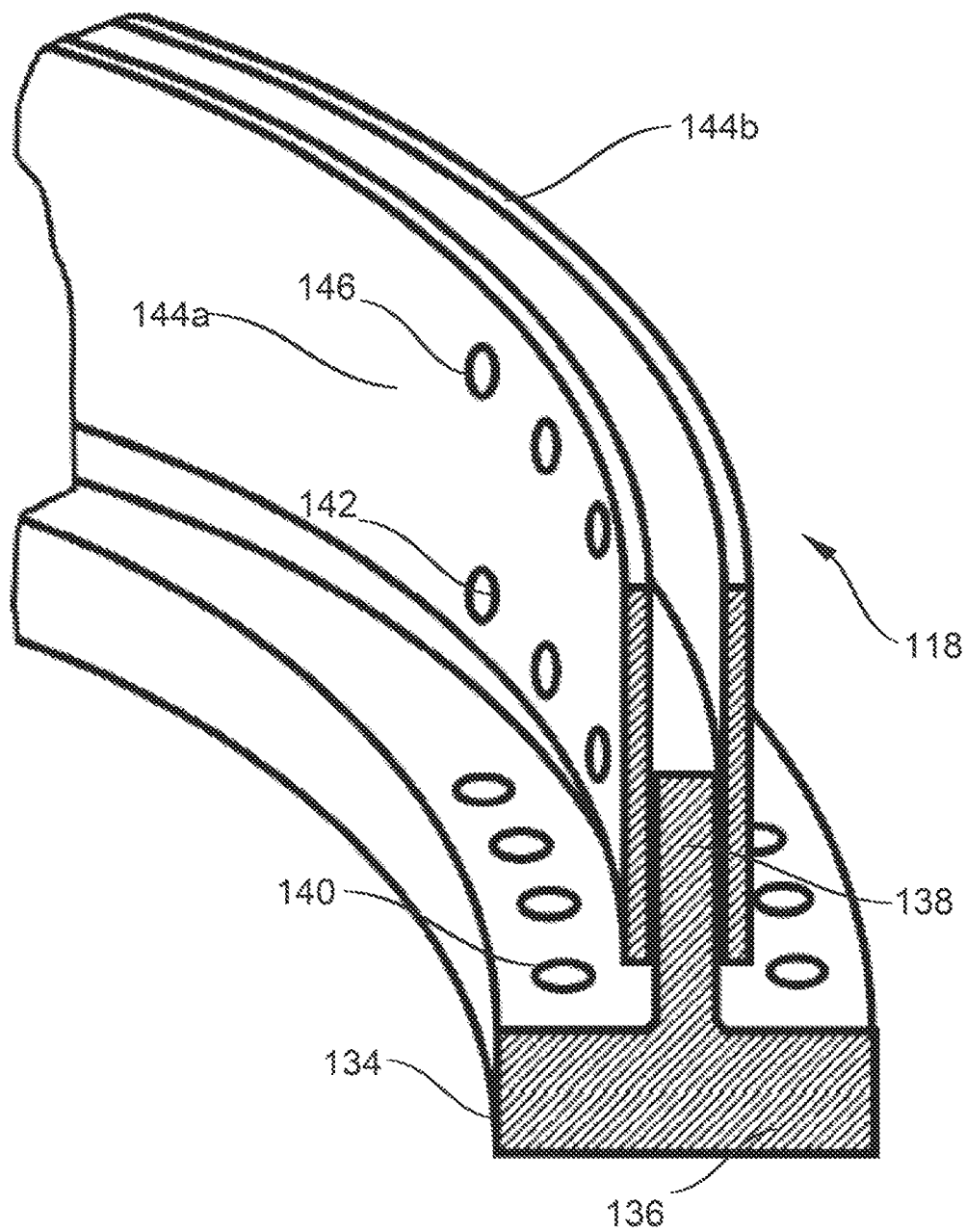
FIG. 9 shows an connector flange for mounting on a tower section.

FIG. 9 shows a perspective view of a connector flange 118 in a partly cutaway view. Connector flange 118 has a T-shaped cross-section 134 and comprises a base plate 136 and a web 138. Base-side holes 140 are arranged in the region of base plate 136. Base-side holes 140 are designed to connect connector flange 118 to a foundation or to a foundation basket at the installation site. Web 138 is preferably narrower in relation to base plate 136, the thickness of web 138 preferably being adapted to the wall thickness t (cf. FIG. 6) of the respective steel tower section 112, 114, 116.

In the region of web 138, connector flange 118 also has a number of tower-side holes 142 that are distributed spaced apart from each other along the circumference of connector flange 118. Tower-side holes 142 are designed to be brought into engagement with two guide plates 144*a*, *b*. The first guide plate 144*a* is disposed on an inside wall of web 138 and partly overlaps the web such that web 138 engages with tower-side holes 142 and the corresponding holes of guide plate 144*a*. The second guide plate 144*b* is disposed on the outwardly facing side of web 138 and partly overlaps web 138 in such a way that the holes of guide plate 144*b* are in alignment with the corresponding tower-side holes 142 of web 138 and can be brought into engagement therewith by means of bolt or screw connections. Guide plates 144*a*, *b* are arranged parallel to each other in such a way that a gap is formed between them with a thickness that is substantially equal to the wall thickness t (cf. FIG. 6) of tower section 112, 114, 116. To mount tower sections 112, 114, 116 (not shown, cf. FIGS. 2*a*-8) on connector flange 118, an end portion of tower section 112, 114, 116 can be guided into the gap formed between guide plates 144*a*, *b* and joined by means of a bolt or screw connection to the upper connection holes 146 of guide plates 144*a*, *b*. Tower section 112, 114, 116 can be arranged in the gap in such a way that the connection holes (not shown) at the end portion of tower section 112, 114, 116 and the connection holes 146 of guide plates 144*a*, *b* are aligned with each other. Bolts or screws can then be passed through connection holes 146 to join connector flange 118 to tower section 112, 114, 116 by a combination of bolting and clamping.

Figure 10:
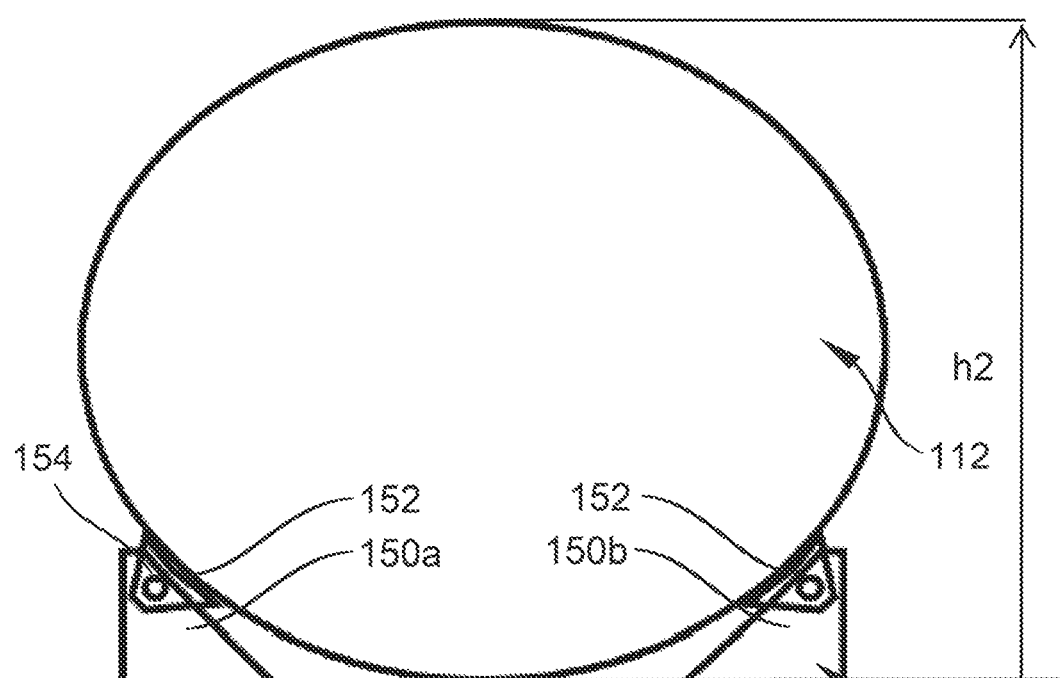
FIG. 10 shows a transportation system for transporting a tower section, in a first preferred embodiment.
Figure 11:
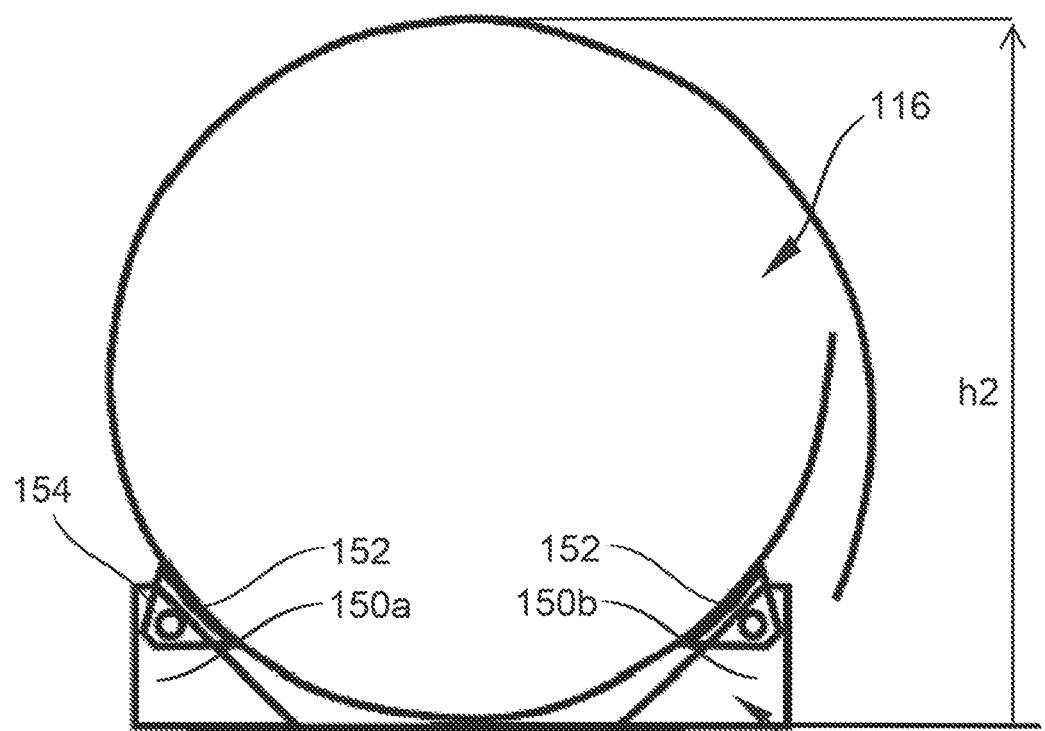
FIG. 11 shows a transportation system for transporting a tower section, according to a second preferred embodiment.

FIGS. 10 and 11 show the transportation system 148, which in FIG. 10 retains a tower section 112 according to a first preferred embodiment and in FIG. 11 a tower section 116 according to a third preferred embodiment in a transport position. In FIGS. 10 and 11, tower sections 112, 116 are retained in the transport position in an elastically deformed state in which they adopt vertical height $h_2$, which is less than height $h_1$ in a relaxed state of the respective tower section 112, 116.

To that end, transportation system 148 has a first and a second pivot bearing 150*a*, *b*, each of which is designed to provide a support surface 152 for a portion of wall 120 of tower section 112, 116. Support surfaces 152 come into contact with an area of wall 120.

By means of the two pivot bearings 150*a*, *b*, support surfaces 152 can be pivoted about a pivot point 154 of the pivot bearing so that the respective tower sections 112, 116 can be retained not only in a relaxed, unstressed state, but also in an elastically deformed state in the transport position.

LIST OF REFERENCE SIGNS

100 Wind turbine
102 Tower
104 Nacelle
106 Rotor arrangement
108 Rotor blades
110 Rotor hub
112, 114, 116 Tower section
118 Connector flange
120 Wall
121 Cross-section
122 Edge regions
124 Edge
126 Joining point
128 Bolt arrangement
128*a* Bolt
128*b* Securing member
129 Steel plates
130 Tensioning system, tensioning cable
131 Recesses
132 Cable winch, chain hoist
134 T-shaped cross-section
136 Base plate
138 Web
140 Base-side holes
142 Tower-side holes
144*a*, *b* Pair of guide plates
146 Connection holes
148 Transportation system
150*a*, *b* First and second pivot bearings
152 Support surface
154 Pivot point
F, $F_1$, $F_2$ Deformation force
L Longitudinal axis
$h_1$ First vertical height
$h_2$ Second vertical height
M Area center The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   transporting a tower section of a wind turbine, the transporting comprising:
   A) providing the tower section adapted to be transported in a predetermined transport position, wherein the tower section when in the transport position has a longitudinal axis extending in a horizontal direction and a wall extending along the longitudinal axis,
   wherein the tower section has a first vertical height when in an unstressed state in the transport position,
   B) using a tensioning system attached to the wall of the tower section to apply deformation forces to place the tower section in an elastically deformed state such that the tower section has a second vertical height that is smaller than the first vertical height, wherein the tensioning system includes at least one component from a list comprising a tensioning strap and tensioning cable, wherein the tensioning system is coupled to a plurality of load inducing elements of the tower section, and C) locking the tower section in the elastically deformed state.

2. The method according to claim 1, further comprising:
D) providing a transportation system for retaining and transporting the tower section in the transport position, and/or
E) moving the tower section onto the transportation system in the transport position.

3. The method according to claim 2, wherein at least one step chosen from the step D) or the step E) are carried out before step B), such that the deformation forces are applied to the wall in the transport position.

4. The method according to claim 1, wherein the wall includes a flowable material and stress induced in the tower section by the deformation forces are less than 0.2% proof stress and/or an elastic limit of the flowable material.

5. The method according to claim 4, wherein the stress induced in the tower section by the deformation forces are within a range from 40% to 95% of a yield point or the 0.2% proof stress.

6. The method according to claim 1, wherein the tower section has a symmetrical shaped cross-section with a central area, and the deformation forces are introduced into the wall of the tower section in a direction of the central area.

7. The method according to claim 1, wherein the tower section has a constant cross-section along the longitudinal axis and is elastically deformed along its longitudinal axis in accordance with step B).

8. The method according to claim 1, wherein at least portions of the tower section tapers in such a way that the second vertical height is a maximum height in the transport position and the tower section is elastically deformed in accordance with step B) in a region adjacent to a maximum height in the direction of the longitudinal axis.

9. The method according to claim 1, wherein the deformation forces of the walls of the tower section is introduced orthogonally to the longitudinal direction.

10. The method according to claim 1, wherein the deformation forces are introduced at least in part by a motor-driven cable pull or chain hoist or cable winch.

11. The method according to claim 1, further comprising arranging stiffening members in the tower section to brace the tower section in the vertical direction, and wherein the stiffening members are arranged in the tower section before elastic deformation.

12. The method according to claim 1, wherein:
the wall has a wall thickness of between 10 mm and 70 mm and a height between 4350 mm and 4850 mm, and
wherein the elastic deformation of the section of the tower section has a coefficient of deformation that is the ratio of the change in vertical height in the transport position as a result of the elastic deformation to the wall thickness, and the coefficient of deformation is in a range from 1.0 to 55.

13. The method according to claim 1, wherein the tower section comprises:
a tower section body that is configured to be transported in the predetermined transport position,
wherein the tower section body has the plurality of load introducing elements, which are arranged spaced apart from each other in the direction of the longitudinal axis.

14. The method according to claim 13, wherein:
the tower section has a round, oval or polygonal cross-section having an area center, and
at least two load introducing elements are fixed inside the wall opposite one another and are adapted to be coupled to each other in pairs by the tensioning system to introduce the deformation force into the wall in the direction of the area center, or
the load introducing elements are arranged on the wall in such a way that the deformation force is introduced into the wall eccentrically, that is, in a direction extending at a distance from the area center.

15. The method according to claim 13, wherein the wall includes a steel material.

16. The method according to claim 13, wherein:
the wall has two edge regions each having an edge extending in a longitudinal direction and are spaced apart from each other in a circumferential direction, and
wherein the edges are designed to be guided past each other during elastic deformation of the tower section such that the two edge regions overlap each other when the tower section is in the elastically deformed state.

17. The method according to claim 1, wherein the transporting comprises transporting on a transportation system, the transportation system comprising:
a first pivot bearing and a second pivot bearing for providing a support surface for the wall of the tower section,
wherein the first and second pivot bearings are adapted to retain the tower section in the transport position in the unstressed state in which the tower section adopts the first vertical height, and in the elastically deformed state in which the tower section adopts the second vertical height that is less than the first vertical height.

18. The method according to claim 1, comprising:
installing a wind turbine at an installation site, the installing comprising:
relaxing the tower section at the installation site, so that that the tower section adopts an unstressed state with a vertical height in the transport position,
at the installation site, fixing a connector flange to an end portion of the tower section by plate connections,
erecting the tower section in such a way that the longitudinal direction is substantially vertical and the connector flange is arranged at the bottom end of the tower section, and
joining the tower section by the connector flange to a foundation embedded in the ground of the installation site.

19. A method comprising:
transporting a tower section of a wind turbine, the transporting comprising:
A) providing the tower section adapted to be transported in a predetermined transport position, wherein the tower section when in the transport position has a longitudinal axis extending in a horizontal direction and a wall extending along the longitudinal axis,
wherein the tower section is adapted to adopt a first vertical height when in an unstressed state in the transport position,
B) applying a deformation force to the wall so as to elastically deform at least one portion of the tower section in such a way that the tower section adopts a second vertical height that is smaller than the first vertical height when in an elastically deformed state in the transport position, and C) locking the tower section in the elastically deformed state, wherein the wall has two edge regions each having an edge extending in a longitudinal direction and spaced apart from each other in a circumferential direction, and wherein the edges are guided past each other when the tower section is elastically deformed, such that the two edge regions overlap each other when the tower section is in the elastically deformed state.

\* \* \* \* \*